(Model.)

2 Sheets—Sheet 1.

D. K. MILLER.
Nail Plate Feeding Machine.

No. 237,119.  Patented Feb. 1, 1881.

Witnesses
C. L. Parker
R. H. Whiteley

Inventor David Knox Miller
By Attorney George H. Christy (Model.) 2 Sheets—Sheet 2.

D. K. MILLER.
Nail Plate Feeding Machine.

No. 237,119. Patented Feb. 1, 1881.

Witnesses.
C. L. Parker
R. H. Whittlesey

Inventor David Knox Miller
By Attorney George H. Christy

UNITED STATES PATENT OFFICE.

DAVID K. MILLER, OF KNOXVILLE, (PITTSBURG P. O.,) ASSIGNOR TO HIMSELF AND P. C. KNOX, OF ALLEGHENY CITY, PENNSYLVANIA.

NAIL-PLATE-FEEDING MACHINE.

SPECIFICATION forming part of Letters Patent No. 237,119, dated February 1, 1881.

Application filed May 10, 1880. (Model.)

*To all whom it may concern:*

Be it known that I, DAVID KNOX MILLER, of Knoxville, (Pittsburg P. O.,) county of Allegheny, State of Pennsylvania, have invented or discovered a new and useful Improvement in Nail-Plate-Feeding Machines; and I do hereby declare the following to be a full, clear, concise, and exact description thereof, reference being had to the accompanying drawings, making a part of this specification, in which—like letters indicating like parts—

Figure 1:
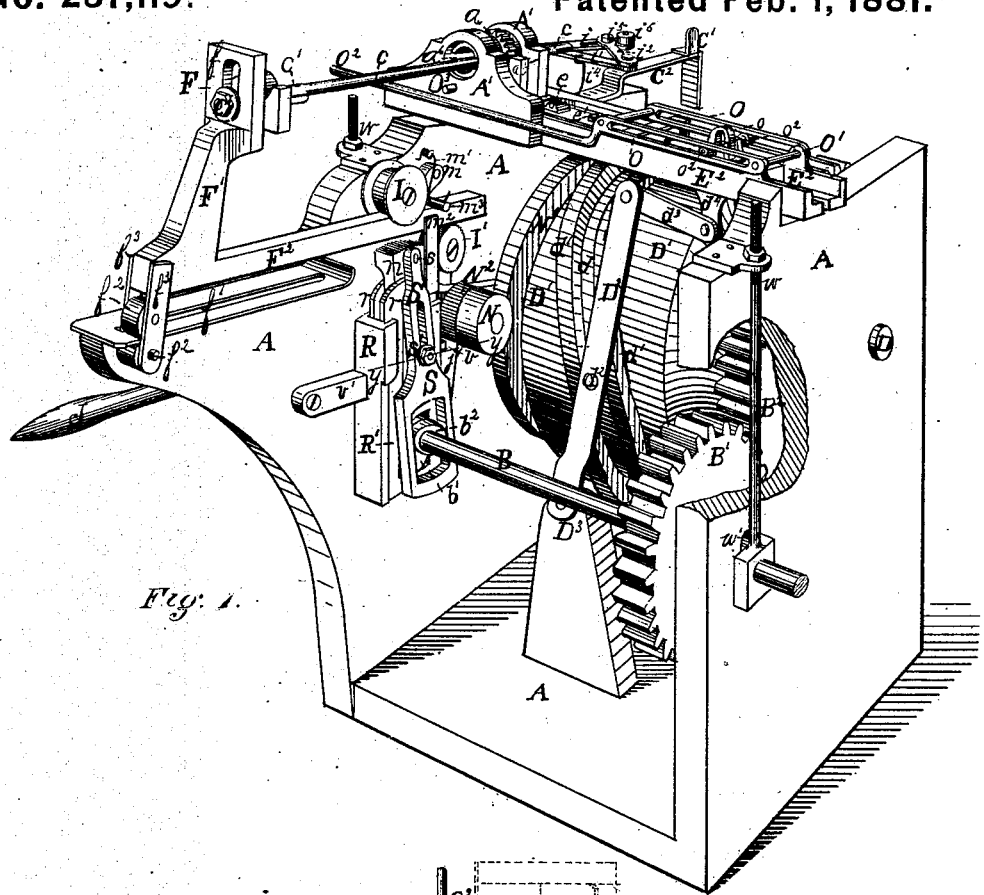
Figure 2:
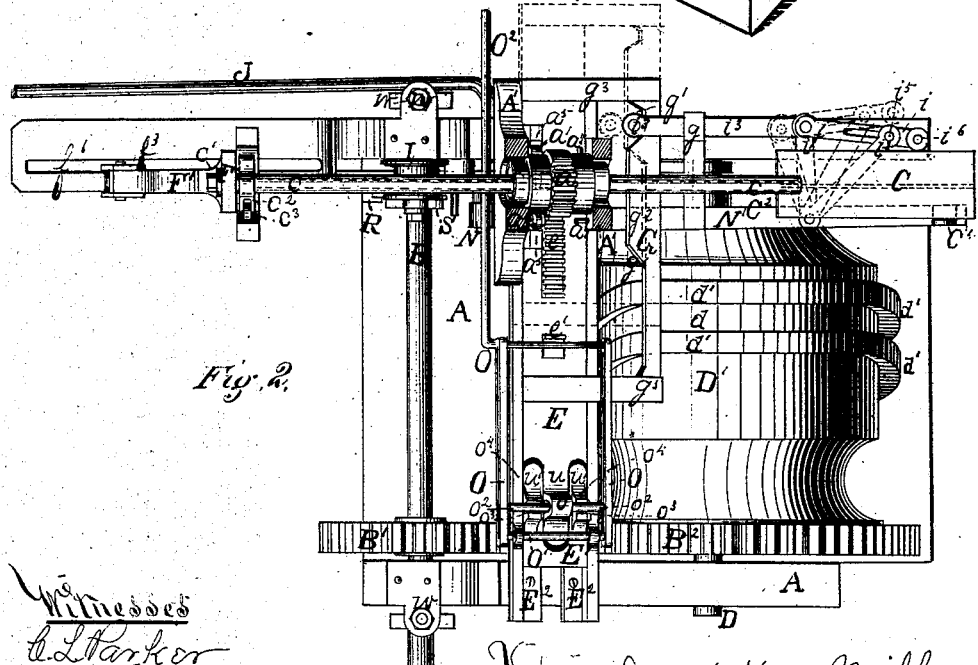
Figure 3:
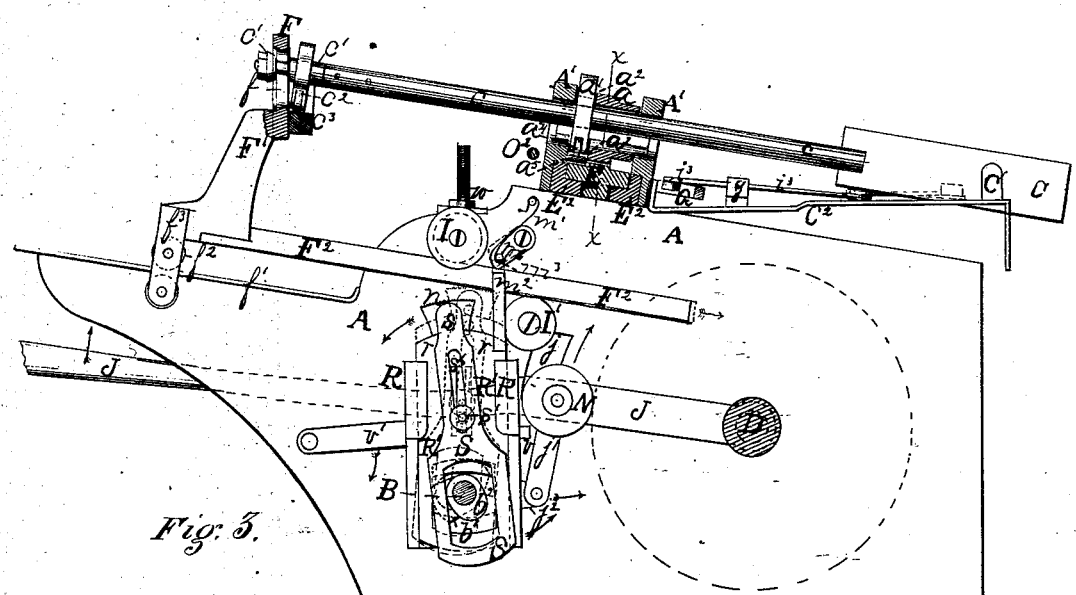
Figure 6:
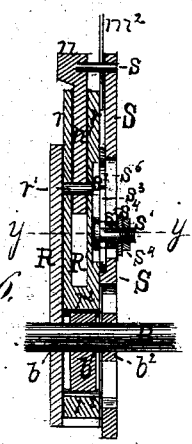
Figure 5:
Figure 4:
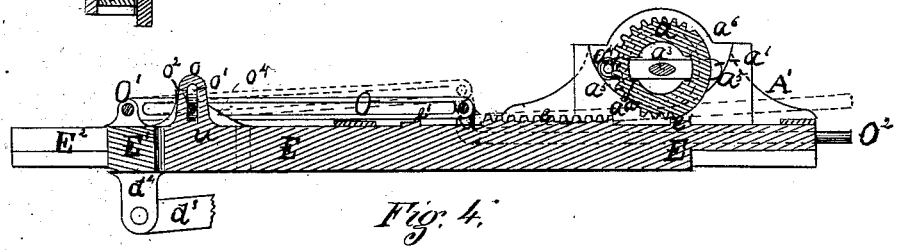

Figure 1, Sheet 1, is a perspective view of my improved machine. Fig. 2 is a top-plan view of the same. Fig. 3, Sheet 2, is a sectional elevation, illustrative of the mechanism for giving a forward feed to the nail-plate. Fig. 4 is a detached sectional elevation, to an enlarged scale, of the mechanism employed for oscillating or turning the nail-plate, the section being taken in the line $x$ $x$, Fig. 3. Fig 5 shows, to an enlarged scale, a transverse section through the pivoted feed device, taken in the line $y$ $y$, Figs. 1 and 6; and Fig. 6 is an enlarged vertical section of the feeder in the plane of the line $z$ $z$, Fig. 5.

My invention relates to mechanism for feeding nail-plates to nail-cutting machines, in which mechanism I employ a yielding or self-adjustable nail-plate holder, a stop or rest against which the nail-plate is pressed by an adjustable pressure-bar, when in position for being cut, an improved rack and pinion for turning the plate, mechanism for giving the plate a regular but intermittent feed, and driving apparatus for operating the several parts in proper order and relation.

In the drawings, A represents the framework of my improved machine, in the side pieces of which is journaled a power-shaft, B, which may be driven in any suitable way; also a shaft, D, geared to shaft B by spur or other suitable gear-wheels B′ B². The shaft D carries a drum-wheel, D′, on the circumference or face of which is made a cam groove or track, $d$. This groove may be cut in the face of wheel D′, though I prefer to form it by a double line of curved or shaped side strips or rails, $d'$, which are bolted or otherwise secured to the periphery of D′ at a uniform distance apart, and the curve of the track made thereby is preferably such as to cause the lever D², which has a pin or wrist, $d^2$, working in the groove, to vibrate twice in each direction for each revolution of wheel D′. I also prefer to make the groove-rails $d'$ in sections or pieces, so that the parts most subject to wear may be renewed at pleasure.

The pin or wrist $d^2$ may carry an antic-friction roller or wheel to work in the groove $d$.

The lever D² is pivoted at its lower end to a post, D³, and at its upper end it is connected, by a link, $d^3$, and pendant or stud $d^4$, to a reciprocating or sliding plate, E E′, Fig. 2. This plate is arranged to move in slides or track-bars E², which are secured across the top of the frame A in any convenient way, which bars also serve as supports for other parts of the apparatus, as hereinafter explained. They are therefore made of considerable strength. The plate E E′ receives reciprocating motion from the vibrating lever D², and this motion is employed to turn or oscillate the nail-plate by means of a rack-bar, $e$, secured to the upper face of plate E, in line therewith, and a pinion, $a$, which is journaled in plumber-blocks A′, carried on the bars E². This pinion has cog-teeth around a part of its periphery, and it is placed in such relation to rack $e$ that the two may gear together, and a reciprocating rotary movement be given to the pinion thereby. The pinion is also made hollow, or is carried on a hollow shaft, through which is passed the plate-holder $c$, and within which it is supported by a bar, $a'$, which passes transversely through one end of the hub or shaft of the pinion, by preference inside one of the plumber-blocks A′. The rectangular form of bar $a'$, and of the mortises $a^2$, through which it passes, prevents its rotation in such mortises. In the center of this bar is an opening, $a^3$, Fig. 4, through which the holder $c$ passes. The ends of the bar protrude somewhat from the surface of the hub, and are rounded or have anti-friction rollers $a^4$ set therein, which bear against a curved or concave track or guide, $a^5$, secured to the adjacent plumber-block. The curve of this guide $a^5$ is such as to raise or push the bar $a'$ endwise as the pinion is partially rotated, and thus raise or lift the nail-plate holder c. This motion is illustrated in full lines, Fig. 3, where the plate-holder c is shown raised or carried by the bar a' to the upper side of the bore of pinion a. The object of this movement is to raise the plate C above its rest or anvil to enable it to be turned, as in Fig. 3. This upward motion or lift should begin promptly with the rotary movement, and this is secured by arranging the bar a' and its track or guide $a^5$ with proper relation to the toothed part of the pinion and the rack.

In order to secure a slight backward movement of the nail-plate when it is turned, so as to free it from pressure against the cutter, I secure the rear end of holder c to a bar or slide, c', which works in a vertical slot, f, cut in the plate F, which latter extends up from the bracket-arm F' of the feed-bar. The plate F is inclined upward away from the line of the holder c, and as the rear end of the holder c is raised it will be drawn backward by the inclination of plate F sufficiently for the purpose required.

In order to insure the requisite lift of the slide c', or of the rear end of the holder, a transverse piece, $c^2$, may be fixed to c', which, by bearing against concave track $c^3$, similar to track $a^5$, raises the rear end of the holder upon each rotary movement, in the manner before described with reference to bar a'. This lifting-bar $c^2$ may be dispensed with, however, in many cases, and the requisite motion be obtained from the bar a' alone; and in order to secure the desired range of motion for the holder slits or notches $a^6$, Fig. 4, may be cut in the inner side of the hub-cavity, so as to enlarge the same in the direction of the bar a'. The length of the rack e is such as to give a half-rotation to the pinion at each stroke; but the range of motion of the reciprocating slide E is greater than is required for this purpose. I therefore make the rack e of proper length to give the pinion a half-rotation, and so arrange it on the plate E that the plate may continue its motion in both directions after the rack has passed out of engagement with the pinion; and in order to secure the re-engagement of the proper teeth on rack and pinion on the next or reverse stroke I arrange outlying teeth or cogs e' at such distance from the ends of the rack proper that as the plate E comes to the end of its stroke these outlying cogs shall engage the pinion-cogs on its under side, and not only give the pinion the desired position with relation to the adjacent end of the rack, but, by its engagement, will hold the pinion, and through it the nail-plate, while a nail is being cut therefrom. Stops $a^5$, on the pinion a and plumber-block A', may also be employed to arrest motion of the pinion. The motion of the reciprocating plate E, after the pinion has ceased to move, is employed to operate a device for pressing the nail-plate against a stationary side guide or rest, C'.

It is very difficult, or practically impossible, to make nail-plates straight. Slight crooks or bends will occur, and when the holder and plate are kept rigidly in one line of feed these crooks will produce some nails without heads and others with too large a head. To remedy this I have made the holder c and its plate free to move laterally when in position for cutting, and to insure the proper position of the plate while the cutting is being done I place a side guide, C', on the end of the projecting bar $C^2$, and in such position with relation to the cutting and heading mechanism as to direct the nail-plate to the proper position. In order to press the edge of the plate C against this guide C', I make use of a pivoted pressure-bar, i, one end of which is arranged to bear, by roller $i^6$, against the outer edge of plate C, as in full lines, Fig. 2, and it is supported on or pivoted to the rest-bar $C^2$ by swinging or pivoted bars i' and $i^2$, while a third bar, $i^3$, extends back from i, through a box or guide, g, to and bears against the notched or cam-shaped edge g' $g^2$ of a bar, G, which is connected with the reciprocating plate E by end bars, $g^3$. The presser-bar i, by reason of its pivoted connection i' and $i^2$, is free to move on such pivots, and as the bar G moves back and forth it will draw the bar $i^3$ back out of the notches g', and thus swing the bar i outward and backward, as in dotted lines, Fig. 2, releasing the nail-plate, so that it may be turned over. The bar i is held back in this way while the full edge $g^2$ of bar G is passing the abutting end of $i^3$, and while the pinion a is in motion. As the bar G is moved along so as to bring the notches g' in line with $i^3$, a spring, $i^4$, Fig. 1, arranged to bear against the radius-bar i', will carry the free end of presser-bar i against the edge of plate C and press it against the guide C'. In order to adjust this pressing device to nail-plates of different widths, I connect the bar $i^2$ with i by a slot and bolt, $i^5$, which is bound tight when properly adjusted, so as to make a rigid connection at that point. By changing the position of bar $i^2$ in this slot the free end of i will be moved in or out. The position of the notches g' with relation to the rack e is such that the pressure-bar i is operated to and away from the edge of plate C while the pinion is at rest, as before described.

In order to give an intermittent forward feed to the nail-plate, so as to carry its end successively under the cutting-dies, I make use of a feed-bar, $F^2$, which extends forward under the holder c and parallel with it. The rear end of bar $F^2$ is connected rigidly to the foot of the bracket or post F', and the frame or carriage thus made is arranged to move back and forth, its rear end being supported and guided on the slotted plate f' by rollers $f^2$, which are journaled between the hangers $f^3$, so as to bear upon the upper and lower side of plate f', one hanger, $f^3$, moving in the slot of f', and both depending from a rigid attachment with frame F' $F^2$. The length of slotted plate f' is sufficient to allow the desired range of motion of the feed-bar. This feed-bar is supported toward its forward end by rollers I I′ bearing against it above and below, the roller I being collared to hold the bar from lateral displacement. The desired forward motion is given to this feed-bar, and through it to the nail-plate, by means of a serrated foot, $n$, which is moved upward against the under side of bar F$^2$, and then carried forward a definite distance, as represented in dotted lines, Fig. 3, and in this forward movement it is pressed against the bar with sufficient force to cause the bar and its connected devices to move forward with it. The foot $n$ is then carried downward and back to the position shown in full lines, Fig. 3. This foot is operated as follows: An open-sided box or guide, R, is supported on the shaft B, which latter passes through a suitable hole, $b$, near the bottom of the box. Within this box or guide is a slide, R′, the upper end of which is slotted or divided into the two side plates, $r\ r$, between which is pivoted, by a pin, $r'$, the stem $n'$ of the serrated foot $n$. The width of the plates $r\ r$ at the top is sufficient to permit the desired range of motion in the foot and its stem. On the lower end of slide R′ is formed a yoke, $r^2$, which incloses a wiper or cam, $b'$, on the shaft, which cam operates against the upper and lower sides of the yoke as the shaft revolves, and thus moves the slide R′, and with it the foot $n$, up and down within the box R. Forward and backward motion is given to the foot by means of a vibrating lever, S, which is connected at its upper end to the stem $n'$ by a bolt or pin, $s$, while its lower end is formed into a yoke which incloses a cam, $b^2$, on shaft B. This lever S is also pivoted by a bolt, $s'$, to the face or side of slide R′. The cam $b^2$ operating against the side bars of its inclosing-yoke gives a vibrating motion to lever S on its pivot $s'$, thus moving the upper end of S, and also the foot $n$, back and forth. The cams $b'$ and $b^2$ are so related with respect to their inclosing-yokes that they impart to the foot $n$ in regular succession an upward, forward, downward, and backward movement.

In order to vary the feed imparted to the nail-plate through the foot $n$, I make the pivot-bolt $s'$ adjustable up and down, so as to vary the distance from cam $b^2$ to the pivot. This I do by letting the head of bolt $s'$ into a recess, $s^2$, made lengthwise in the face of plate $r$, and covering or securing it by a slotted plate, $s^3$. Instead, however, of making a recess, $s^2$, the plate $s^3$ may be raised from the face of plate $r$ sufficiently to receive the head of the bolt. A nut and washer, $s^4$, on the end of the bolt are screwed down upon a sleeve, $s^5$, which is fitted on the bolt, and thereby clamp the bolt firmly to the slotted plate $s^3$ without binding the vibrating lever S. This bolt and sleeve pass through a slot, $s^6$, in the lever, S, and on loosening the nut $s^4$ the bolt may be moved up or down within the slots of lever S and plate $s^3$, and again clamped at the desired point.

It will be observed that the slide R′, lever S, and foot $n$ all turn with the box R upon its shaft-bearing $b$. In order to hold them in working position a stop, $v$, is fixed to the frame A in proper position for the front side of box R to rest against it, and to hold it on the rear side a pivoted locking-bar, $v'$, is used, which is dropped from above to the position shown in Figs. 1 and 3, and its free end, bearing against the edge of box R, holds it firmly against the stop $v$. By raising the lock $v'$ the box with the devices attached thereto may be turned backward on the bearing $b$ out of position to operate the feed-bar, although the foot $n$ will still continue its motions while the shaft B rotates. For convenience in moving this foot into and out of working position, I employ a lever, J, pivoted at its front end to shaft D, on the inside of frame A, and extending back nearly to the box R, where, by a bend, it passes through a slotted opening, $j$, to the outside of frame A, and extends backward on such outside to a convenient position for the operator. An arm, $j'$, extending down from this lever has a pivoted connection with a stud, $j^2$, extending out from the box a little below its bearing, so that by moving the end of the lever the box will be turned, as described.

For convenience in running the feed-bar back, I journal a loose wheel, N, to lever J, so that its periphery may bear against the disk-wheel or collar N′, which latter is carried on the drum D′. The wheel N will thus receive rotary motion by frictional contact; also, as the free end of lever J is raised to throw the foot $n$ out of gear, this wheel N is carried up on the periphery of wheel N′ until its inner half, N$^2$, which may be roughened on its surface, bears against the under bearing wheel or roller, I′, and through its frictional contact imparts rotary motion to I′, which in turn will carry the feed-bar F$^2$ backward. Then, when desired, the lever J may be pressed down sufficiently to break this frictional contact between N$^2$ and I′, and still leave the foot $n$ turned back out of gear.

In order to prevent the jarring of the machine from moving the feed-bar forward, I pivot a pawl or dog, $m$, to the side A, and press its free end upon the feed-bar by a spring, $m'$, so as to oppose forward movement of the bar. An arm, $m^2$, extending up from plate $r$, will engage a pin, $m^3$, and raise the dog $m$ when the foot $n$ is raised, and also will hold the dog off the feed-bar until the foot has made its forward stroke and is again carried down.

It is important that the cams $b'\ b^2$ and cam-groove $d$ should operate their respective devices always in the same order and succession. I prefer, therefore, not to break the gear-connection between these parts, and have devised the construction described for turning the foot $n$ out of working position with the feed, and thereby stop the feed and, if desired, run back the feed-bar without stopping the motions of the cams $b'\ b^2$ and foot $n$. For the same reason it is desirable to stop the rotary movement of holder $c$ without stopping the cam-wheel D'. I effect this by the following construction: The reciprocating plate E E' is divided transversely into two parts, as shown, and connection is made from vibrating lever D² to the part E'. A tongue, $u$, projects from the part E into a corresponding recess in part E', thereby lapping or extending such tongue past the side projections, $u'$. A lug, $o$, is raised on the tongue $u$, having in it a slot or vertically-elongated hole, $o'$, through which is passed a coupling-pin, $o^2$, which, when it rests on or near the bottom of slot $o'$, also rests in open-topped seats or notches $o^3$ made in the lugs $o^4$ on the side pieces, $u'$, and when in this position this pin will couple the two parts E E' together, so that the motion of E' will be imparted to the part E, as hereinbefore described; but if the bolt or pin $o^2$ be raised out of the notches $o^3$ the parts E E' will be separated. In order to effect this coupling and uncoupling, I pass the ends of the bolt or pin $o^2$ between the upper and lower side bars of a track-frame, O. This frame is pivoted at its rear end toward the slide E' by a rod, as at O'. A lever, O², extends across the machine from its free end to a convenient position for the operator. When this track lies horizontal, resting on the rails E², the pin $o^2$ will be kept in the notches $o^3$ throughout its range of motion, and the parts E E' will be coupled together, as before described; but if the free end of track O be raised the pin $o^2$ will be lifted out of the notches $o^3$ as it approaches such raised end, and the parts E E' be thereby uncoupled, and upon the back or reverse stroke of E' the part E, which carries the rack $e$, will be left at the limit of its stroke, and the turning of holder $c$ will cease. The part E' will, however, continue its motion, and to prevent it from pounding against E, I separate the tongues $u$ $u'$ at the line of connection by a little space. The track may be held in this elevated or inclined position by a pin, O³, placed under the lever O², or otherwise. When it is again desired to put the holder $c$ in motion the track O is let down to a horizontal position; then, as the part E' approaches E, the pin $o^2$ will ride up the inclined sides of lugs $o^4$, raising the end of the track in so doing, and then drop into the notches $o^3$, thereby coupling the parts E E'.

I have shown adjusting-rods $w$ connected with shaft B, whereby the shaft may be raised or lowered, and by curving slightly the slots $w'$ of the shaft-bearing this adjustment may be made concentric with wheel B², so as not to separate the gearing between the shafts B D. The main purpose of this adjustment is to secure the proper pressure of foot $n$ against the under side of bar F² as the foot or bar wears away or varies.

I claim herein as my invention—

1. In a nail-plate-feeding machine, the combination of a fixed guide, C', a movable pressure-bar, $i$, radius bar or link $i'$, adjusting-bar $i^2$, the latter being pivoted at one end to a support and having at its other end a connection with bar $i$, adjustable along its length, and a spring $i^4$, arranged to bear against bar $i'$, substantially as and for the purposes set forth.

2. An oscillating or rotary holder, $c$, adapted to carry a nail-plate, in combination with guide C', pressure-bar $i$, radius-bars $i'$ $i^2$, spring $i^4$, for pressing bar $i$ against the plate and guide, and arm $i^3$, and reciprocating cam-bar G, for withdrawing bar $i$ and releasing the plate, substantially as set forth.

3. The combination of pinion $a$, nail-plate holder $c$, reciprocating slide E, having a range of motion in excess of a half-rotation of the pinion, rack $e$, adapted in length to give a half-rotation to the pinion, and arranged to pass engagement therewith at either end before the slide reaches the limit of its motion, outlying cogs $e'$, arranged to engage the pinion, as described, at the limit of either motion of the slide, cam-plate G, arranged to move with the slide, fixed guide C' on one side of the line of the nail-plate, pivoted or movable pressure-bar $i$ on the other side, connecting-bar $i^3$, and spring $i^4$, the same being combined and arranged as described, whereby the nail-plate is pressed against the fixed guide when the rack is out of engagement with the pinion, and is released from such pressure while in engagement, substantially as set forth.

4. The combination of hollow pinion $a$, bar $a'$, passing loosely through the hub of the pinion in a transverse direction with its ends projecting from the hub, holder $c$, passing longitudinally through the hub and supported therein by the bar $a'$, and curved track or guide $a^5$, adapted to force bar $a'$ endwise on each half-rotation of the pinion, substantially as set forth.

5. The combination of pinion $a$, bar $a'$, curved track or guide $a^5$, holder $c$, having a slide, $c'$, on its rear end, and guide-plate F, the direction upward of such guide making an obtuse angle with the line of the holder, substantially as set forth.

6. The combination of the two-part slide E E', having thereon matched or lapping projections $u$ $u'$, and lugs $o$ $o^3$, with bolt or pin $o^2$, and track O, the latter being changeable to positions either parallel with or inclined to the direction of motion of the slide, substantially as set forth.

7. In combination with nail-plate holder $c$, the carriage or frame F F' F², supported on rollers and plate $f'$ $f^2$, and between collared roller I and plain roll I', substantially as set forth.

8. The combination of nail-plate holder $c$, feed-carriage F F' F², pressure-foot $n$, and mechanism for imparting to the foot, successively, pressure against the bar F² of the carriage with movement forward, and a release of such pressure with movement backward, substantially as and for the purposes set forth.

9. The combination of pivoted box R, slide R', foot $n$, vibrating lever S, shaft B, and cams $b'$ $b^2$, substantially as set forth.

10. The combination of slide R', foot $n$, lever S, cams $b'$ $b^2$, and pivot-bolt $s'$, adjustable in position along the length of lever S, substantially as described, whereby the length of stroke of feed of foot $n$ may be varied.

11. The box R, pivoted on the shaft B and carrying the feed-imparting mechanism, in combination with lever J and jointed connection $j'$ $j^2$, substantially as set forth.

12. The combination of lever J, disk-wheel $N'$, friction-wheel N $N^2$, rollers I and $I'$, and feed-bar $F^2$, substantially as set forth.

13. The combination of feed-carriage F $F'$ $F^2$, supporting-rolls I $I'$, dog $m$, spring $m'$, arm $m^2$, slide $R'$, and operating-cam $b'$, substantially as set forth.

14. The combination of pivoted box R, carrying thereon the feed-imparting mechanism, a stop, $v$, supporting the box on one side above its pivot, and a removable lock, $v'$, arranged to hold the other side of the box, substantially as set forth.

In testimony whereof I have hereunto set my hand.

DAVID KNOX MILLER.

Witnesses:
C. L. PARKER,
R. H. WHITTLESEY.